US012562942B2

(12) United States Patent
Paulik et al.

(10) Patent No.: US 12,562,942 B2
(45) Date of Patent: Feb. 24, 2026

(54) ENHANCING SIGNAL FIDELITY DURING INTERPOLATION

(71) Applicant: INTERNATIONAL BUSINESS MACHINES CORPORATION, Armonk, NY (US)

(72) Inventors: George Paulik, Rochester, MN (US); Jarrett Betke, Hoffman Estates, IL (US); Austin Carter, Olmsted, MN (US); Kevin Daniel Escobar, Rochester, MN (US); Timothy Lindquist, Rochester, MN (US); Daniel Ramirez, Rochester, MN (US); Bryce Snell, Rochester, MN (US); George Russell Zettles, IV, Rochester, MN (US); Jeremy T. Ekman, West Concord, MN (US); Scott M. Willenborg, Stewartville, MN (US); Matthew A. Walther, Byron, MN (US); Alexander Jay Wolseth, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 159 days.

(21) Appl. No.: 18/660,174

(22) Filed: May 9, 2024

(65) Prior Publication Data
US 2025/0350508 A1     Nov. 13, 2025

(51) Int. Cl.
*H04L 25/06* (2006.01)
(52) U.S. Cl.
CPC .................................. *H04L 25/06* (2013.01)

(58) Field of Classification Search
CPC ...................................................... H04L 25/06
See application file for complete search history.

(56) References Cited

U.S. PATENT DOCUMENTS 4,890,106 A    12/1989  Belcher
5,200,750 A *   4/1993  Fushiki ................ H03M 7/3011
                                                    341/131
(Continued)

FOREIGN PATENT DOCUMENTS

CA          3141547 C      2/2024
CN       113169950 A      7/2021
(Continued)

OTHER PUBLICATIONS

Li, K et al.; "Amplitude Stability Analysis And Experimental Investigation Of An AC Excitation Signal For Capacitive Sensors", Sensors and Actuators A: Physical (2020), vol. 309, 6 pgs.
(Continued)

*Primary Examiner* — Vineeta S Panwalkar
(74) *Attorney, Agent, or Firm* — Amin, Turocy & Watson, LLP

(57) ABSTRACT

An apparatus is provided for processing a digital signal for a digital-to-analog converter ("DAC"). The apparatus includes a monitoring component configured to monitor a sequence of samples of the digital signal for a predetermined pattern of signal values. Upon determining that the sequence of samples does include the predetermined pattern of signal values, then samples in the sequence of samples that include the predetermined pattern of signal values are sent to the DAC. Noise is injected into an interpolation component, and the noise is withheld from an output of the DAC.

20 Claims, 18 Drawing Sheets

(56)                 References Cited

U.S. PATENT DOCUMENTS

| | | | |
|---|---|---|---|
| 5,990,819 A * | 11/1999 | Fujimori | H03M 1/806 341/150 |
| 6,828,847 B1 | 12/2004 | Marinca | |
| 7,317,411 B1 * | 1/2008 | Nanda | H03M 3/3287 341/131 |
| 10,333,473 B1 | 6/2019 | Shen | |
| 10,416,295 B2 | 9/2019 | Warburton | |
| 10,498,563 B2 | 12/2019 | Lin | |
| 10,764,105 B2 | 9/2020 | Konradsson | |
| 10,782,148 B2 | 9/2020 | Wu | |
| 10,979,038 B2 | 4/2021 | Frounchi et al. | |
| 10,999,117 B2 | 5/2021 | Pawar | |
| 11,454,394 B2 | 9/2022 | Pavithran | |
| 11,695,424 B2 | 7/2023 | Betke | |
| 11,733,286 B2 | 8/2023 | Ma et al. | |
| 2018/0113203 A1 | 4/2018 | Warburton | |
| 2020/0287761 A1 | 9/2020 | Pawar et al. | |
| 2021/0203282 A1 | 7/2021 | Van Liere | |
| 2022/0413864 A1 | 12/2022 | Lindquist | |
| 2023/0198399 A1 | 6/2023 | Lv | |
| 2023/0291432 A1 | 9/2023 | Andreas | |
| 2023/0306286 A1 | 9/2023 | Guoming | |
| 2023/0394347 A1 | 12/2023 | Betke | |

FOREIGN PATENT DOCUMENTS

| | | |
|---|---|---|
| EP | 2904247 B1 | 8/2020 |
| JP | 4476276 B2 | 6/2010 |
| WO | 2015/197030 A1 | 12/2015 |

OTHER PUBLICATIONS

Chen, B. et al., "An Adaptive Observer-Based Robust Estimator Of Multi-Sinusoidal Signals", TAC IEEE Transactions On, vol. 63, Issue 6, pp. 1618-1631, Jun. 2018.
Kalinovskis, A. et al., "ETAM: Next Generation Event Timer For Picosecond-Presision Time And Amplitude Measurements", Sensors (2023), vol. 23, 14 pgs.
Calosso, C. E. et al.; "Phase-Noise And Amplitude-Noise Measurement Of DACs And DDSs", TUFFC IEEE Transactions On, vol. 67, Issue 2, pp. 431-439, Feb. 2020.
Ren, Y. et al., "Frequency and Amplitude Stabilized Terahertz Quantum Cascade Laser as Local Oscillator", Applied Physics Letters (2012), vol. 101, 4 pgs.

* cited by examiner

100 ⌐

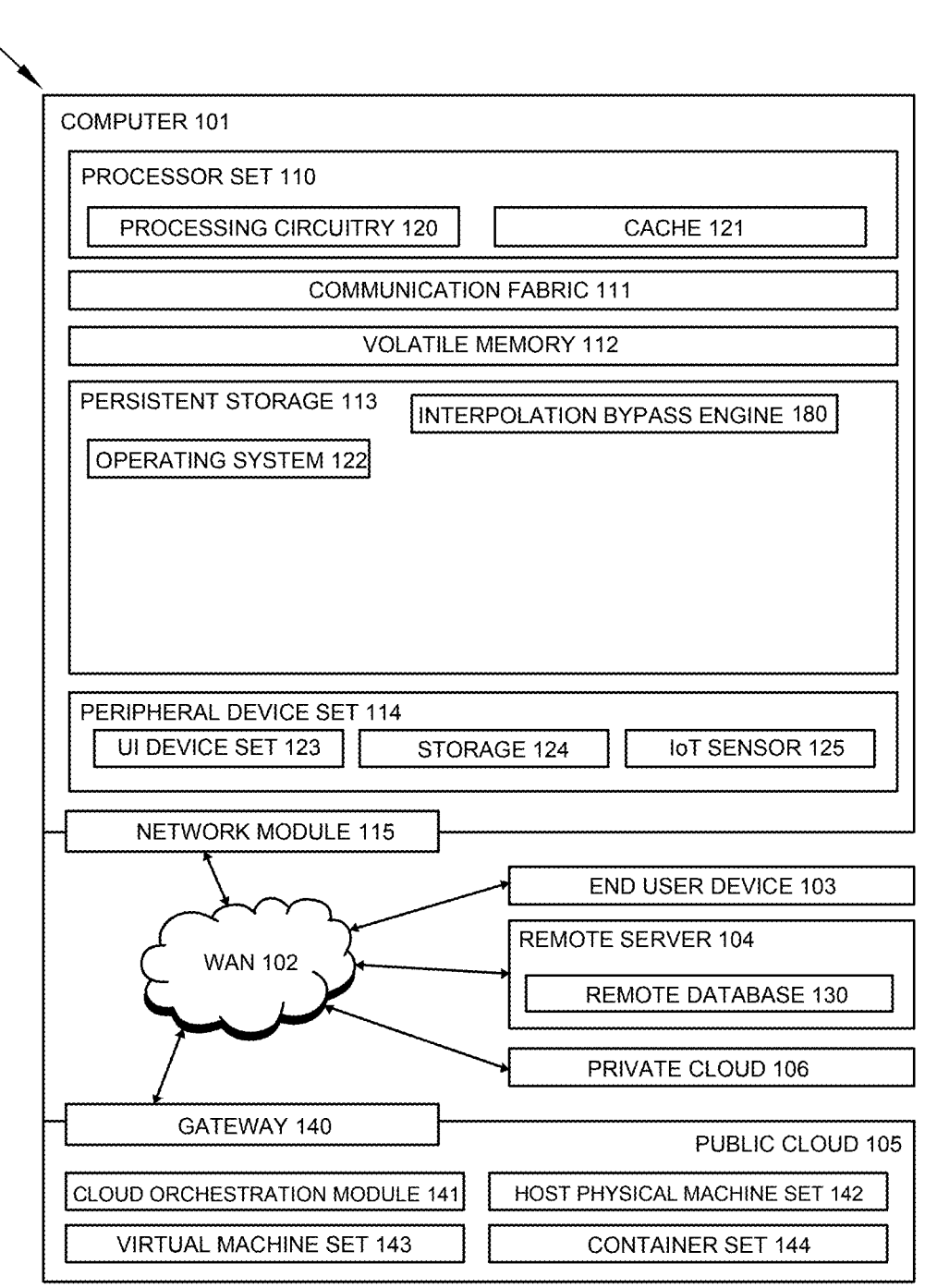

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113          INTERPOLATION BYPASS ENGINE 180

OPERATING SYSTEM 122

PERIPHERAL DEVICE SET 114

UI DEVICE SET 123          STORAGE 124          IoT SENSOR 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

ENHANCING SIGNAL FIDELITY DURING INTERPOLATION

BACKGROUND

Technical Field

The present disclosure generally relates to processing control signals for enhanced fidelity, and more particularly but not by way of limitation, to stabilizing amplitude and reducing noise during interpolation of a control signal.

Description of the Related Art

Enhancing signal fidelity is useful in many contexts, such as to reduce errors from disturbances that can occur when interpolating signals for improved signal resolution. Amplitude stability and noise mitigation can become more challenging where tighter error margins come into play in low latency, high sensitivity computer systems such as quantum computing systems.

Quantum computing is an implementation of a quantum computer in superconducting electronic circuits. Quantum computation studies the application of quantum phenomena for information processing and communication. Various models of quantum computation exist, and the most popular models include the concepts of qubits and quantum gates. A qubit is a generalization of a bit that has two possible states but can be in a quantum superposition of both states. A quantum gate is a generalization of a logic gate, however the quantum gate describes the transformation that one or more qubits will experience after the gate is applied on them, given their initial state. Various quantum phenomena, such as superposition and entanglement, do not have analogs in the world of classical computing and therefore may involve special structures, techniques, and materials.

SUMMARY

According to an embodiment, a computer-implemented method is provided for processing a digital signal for a digital-to-analog converter ("DAC"). The method includes sampling a sequence of the digital signal, and determining whether the sampled sequence includes a predetermined pattern of signal values. Upon determining that the sampled sequence does include the predetermined pattern of signal values, then samples of the sampled sequence including the predetermined pattern of signal values are sent to the DAC. Noise is injected into an interpolation component, and the injected noise is withheld from an output of the DAC.

In one embodiment, the noise includes using the interpolation component to compute interpolation values for tuning samples not included in the samples of the sequence.

In one embodiment, the sequence of the digital signal is a first sequence of the digital signal. The method further includes sampling a second sequence of the digital signal and monitoring a predetermined number of samples of the second sequence for the predetermined pattern of signal values. Upon determining that the second sequence does not include the predetermined pattern of signal values, then the method includes switching to using the interpolation component to compute interpolation values for samples of the second sequence.

In one embodiment, the method further includes storing the tuning samples to a computer memory and retrieving the stored tuning samples from the computer memory in computing interpolation values for the tuning samples.

In one embodiment, the tuning samples comprise a waveform.

In one embodiment, the tuning samples are operative to provide a predetermined computational load on the interpolation component.

In one embodiment, the noise includes gating pseudorandom broadband noise in a data pattern signal to the interpolation component.

In one embodiment, the gating pseudorandom broadband noise includes a waveform encapsulation marker in the data pattern signal.

In one embodiment, the noise includes periodic noise correlated to a predetermined frequency restriction of the interpolation component.

In one embodiment, the method further includes transmitting the digital signal to control a qubit in a quantum computer.

In one embodiment, an apparatus is provided for processing a digital signal for a digital-to-analog converter ("DAC"). The apparatus includes a monitoring component configured to monitor a sequence of samples of the digital signal for a predetermined pattern of signal values. Upon determining that the sequence of samples does include the predetermined pattern of signal values, samples in the sequence of samples that include the predetermined pattern of signal values are sent to the DAC. Noise is injected into an interpolation component, and the noise is withheld from an output of the DAC.

In one embodiment, the injected noise is configured to match a power envelope of the interpolation component.

In one embodiment, the injected noise is configured to hold electrical power consumption of the interpolation component substantially constant during operational and latency periods.

In one embodiment, the apparatus further includes a computer memory configured to store the injected noise including a sampled sequence of the signal.

In one embodiment, the interpolation component is configured to compute the interpolation values for a predetermined number of the samples in the sequence of samples.

In one embodiment, the predetermined number of samples in the sequence is less than or equal to a total number of samples in the sequence of samples.

In one embodiment, the noise includes gating pseudorandom broadband noise in a data pattern signal to the interpolation component.

In one embodiment, the gating pseudorandom broadband noise includes a waveform encapsulation marker in the data pattern signal.

In one embodiment, the noise includes periodic noise correlated to a predetermined frequency restriction of the interpolation component.

According to one embodiment, a computer system is provided for processing a digital signal for a digital-to-analog convertor ("DAC"). The computer system includes a processor, a computer-readable memory, a computer-readable tangible storage device, and program instructions stored on the computer-readable storage device for execution by a processor via the computer-readable memory. The computer system is configured to sample a sequence of the digital signal and determine whether the sampled sequence includes a predetermined pattern of signal values. Upon determining that the sampled sequence does include the predetermined pattern of signal values, then samples of the sampled sequence that include the predetermined pattern of signal values are sent to the DAC. Noise is injected into an interpolation component, and the noise is withheld from an output of the DAC.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1 is a block depiction of a classical computer hardware platform for efficient and reliable signal processing, consistent with illustrative embodiments.

DETAILED DESCRIPTION

Figure 2:
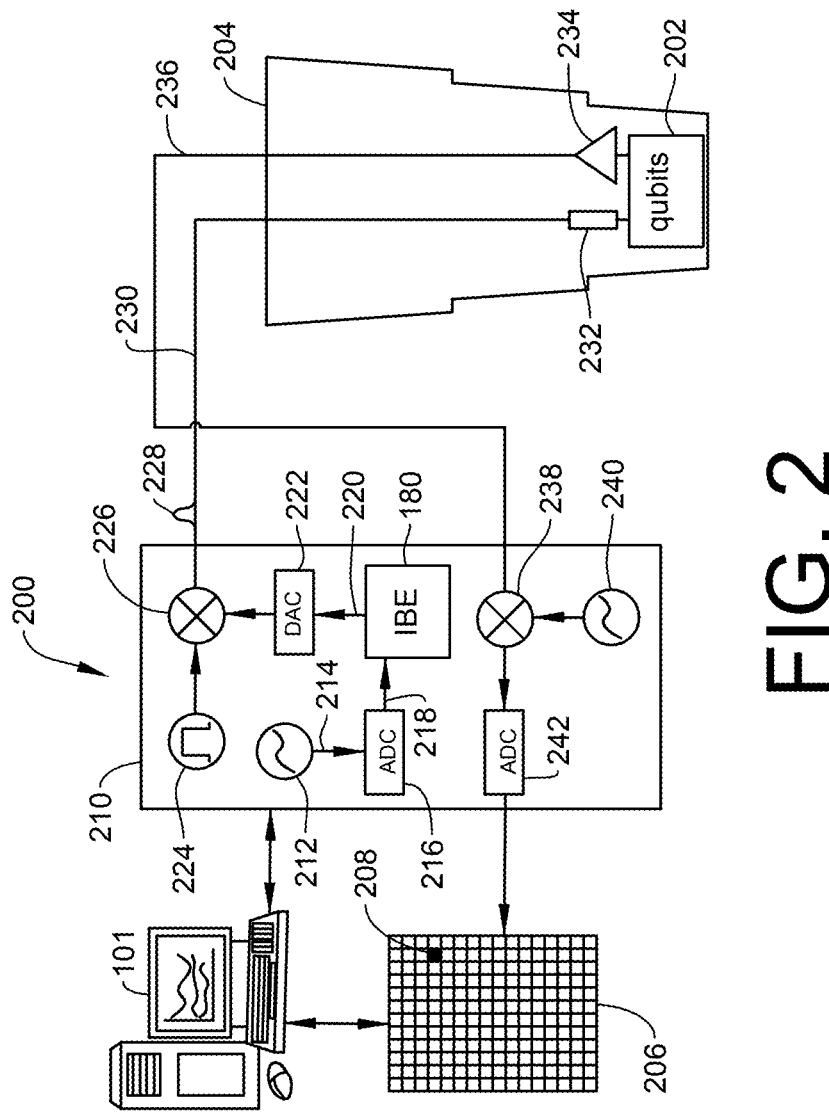
FIG. 2 diagrammatically depicts a quantum computing system, consistent with illustrative embodiments.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Although the terms first, second, third, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It is to be understood that other embodiments can be used, and structural or logical changes can be made without departing from the spirit and scope defined by the claims. The description of the embodiments is not limiting. In particular, elements of the embodiments described hereinafter may be combined with elements of different embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Referring to FIG. 1, environment 100 includes an example of an environment for the execution of at least some of the computer code involved in performing the inventive methods discussed herein, including an interpolation bypass engine (or block) 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Accordingly, the computing system generally facilitates signal processing in accordance with one or more embodiments illustratively described herein. For example, the signal processing can be related to artificial neural network systems, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, a medical system, an industrial system, a manufacturing system, and/or another digital system. The system can employ hardware and/or software to solve problems that are highly technical in nature, that are not abstract and that cannot be performed as a set of mental acts by a human.

For simplicity of explanation, the specialized-computer-implemented methods are depicted and described as a series of acts. It is to be understood and appreciated that the subject innovation is not limited by the acts illustrated and/or by the order of acts. That is, for example, acts can occur in various orders and/or concurrently, and with other acts not presented and described herein. Furthermore, not all expressly disclosed acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from a computer-readable device or storage media.

The system can employ hardware and/or software to solve problems that are highly technical in nature, that are not abstract and that cannot be performed as a set of mental acts by a human. One or more embodiments of the system can also provide technical improvements to a computer processing unit associated with control signal processing by improving processing performance of the computer processing unit, reducing computing errors and computing bottlenecks of the computer processing unit, improving processing efficiency of the computer processing unit, and/or reducing an amount of time for the computer processing unit to perform a computer process.

In this disclosure of illustrative embodiments, FIG. 2 depicts a quantum computing system 200. It generally has a control computer (such as 101 in FIG. 1) configured to perform classical computing processes to control read and write signals to qubits 202 included in a dilution refrigerator 204. The control computer 101 operates at room temperature which can be about 300 Kelvin ("K"). The dilution refrigerator 204 typically removes heat in stages, such as a first stage reducing the temperature to about 1 K, a second stage to about 100 Millikelvin ("mK"), and a third stage to about 4 mK where superconducting can occur.

The control computer 101 includes or has access to a computer memory 206 that can be mapped to registers 208, which are individually programmable to store either a logical "1" or a logical "0" value. Multiple registers 208 can be grouped into register blocks for storing data values and data structures. These stored values can reflect the values written to and retrieved from the qubits 202. The control computer 101 also includes or has access to a microwave control and measurement hardware block 210. Within the block 210, an oscillator 212 can generate an analog signal 214 of a desired microwave frequency. The analog signal 214 can be passed through an analog-to-digital converter ("ADC") 216 to form a digital signal 218 suitable for processing by the interpolation bypass engine ("IBE") 180. The IBE output 220 can be passed through a digital-to-analog converter ("DAC") 222 and combined with the output of a pulse generator 224 by a mixer 226, such as an in-phase and quadrature ("I-Q") mixer. In this manner, the correct signal 228 to control the qubits 202 can be imparted to the drive line 230. For example, transmitting a certain pulse energy at an excited energy level can invert a qubit's spin and thereby write its value to a logical 1. A signal 228 of a selected pulse frequency transmitted on the drive line 230 typically passes through one or more attenuation blocks 232 to reduce signal noise.

In one example, to read out the qubit state, a microwave signal can be applied to the microwave readout cavity that couples to the qubit at the cavity frequency. The transmitted (or reflected) microwave signal goes through multiple thermal isolation stages and low-noise amplifiers 234 that are used to block or reduce the noise and improve the signal-to-noise ratio. The read line 236 can feed another mixer 238 and phase-locked oscillator 240, then passed through another ADC 242 to store the read values to the memory 206. Alternatively, or in addition, a microwave signal (e.g., pulse) can be transmitted on the drive line 230 to entangle the qubits.

Much of the process is performed in a cold environment (e.g., in the dilution refrigerator 204), while the microwave signal of a qubit is ultimately measured at room temperature. The amplitude and/or phase of the returned/output microwave signal carries information about the qubit state, such as whether the qubit has dephased to the ground or excited state. The microwave signal carrying the quantum information about the qubit state is usually weak (e.g., on the order of a few microwave photons). To measure this weak signal with room temperature electronics (i.e., outside the refrigerated environment), low-noise quantum-limited amplifiers (QLAs), such as Josephson amplifiers and travelling-wave parametric amplifiers (TWPAs), can be used as preamplifiers (i.e., first amplification stage) at the output of the quantum system to boost the quantum signal, while adding the minimum amount of noise as dictated by quantum mechanics, in order to improve the signal-to-noise ratio of the output chain.

It has been determined that to increase the reliability of a quantum computer, improvements can be made to reduce the error rates, which is relevant to manipulate qubit states accurately and perform sequential operations that provide consistent results and not merely unreliable data. Some such errors stem from power and heat fluctuations when electronic circuits and components become idle or are subjected to power saving routines. The power inrush and heat generated from returning to operation from an idle or reduced-power event are disturbances that can degrade signal fidelity by creating amplitude instability and generating signal noise.

In one aspect, the teachings herein are based on Applicants' insight that directly applying conventional integrated circuit techniques for interacting with computing elements to superconducting quantum circuits may not be effective because of the unique challenges presented by quantum circuits that are not presented in classical computing architectures. Accordingly, embodiments of the present disclosure are further based on recognition that issues unique to quantum circuits have been taken into consideration when evaluating applicability of conventional integrated circuit techniques to building superconducting quantum circuits, and, in particular, to electing methods and architectures used for interacting efficiently with qubits.

Figure 3:
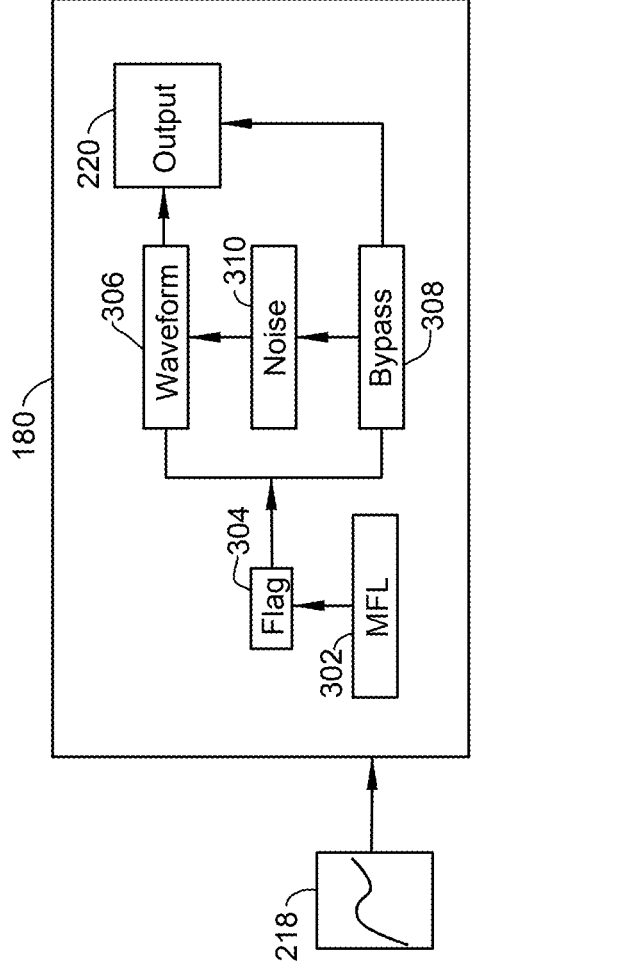
FIG. 3 is a block depiction of the interpolation bypass engine processing a digital signal for enhanced signal fidelity in the quantum computing system of FIG. 2, consistent with illustrative embodiments.

FIG. 3 is a block depiction of the IBE 180 processing the signal 218 to derive the output signal 220 configured for optimal operation of the DAC 222 (FIG. 1). Block 302 monitors for latency ("MFL") in the signal 218, such as comparing sequences of the signal 218 for a predetermined pattern of signal values. Block 304 is responsive to block 302 in performing mode control in view of programmed rules and commands, such as switching the operational mode by asserting a control flag. When block 302 determines that a selected sequence of the signal 218 does not include the predetermined pattern of signal values, then the IBE 180 invokes a waveform mode 306. In the waveform mode 306, interpolation values are computed for the samples of the selected sequence. These computed interpolation values are then included in the output signal 220 and, in turn, sent to the DAC 222 of FIG. 2.

Otherwise, when block 302 determines that the selected sequence of the signal 218 does include the predetermined pattern of signal values, then the IBE 180 invokes a bypass mode 308. In the bypass mode 308, the samples of the selected sequence that include the predetermined pattern of signal values are included in the output signal 220 and, in turn, sent to the DAC 222. Furthermore, block 310 injects noise into the interpolation block 306 but this noise is withheld from the DAC 222.

Figure 4A:
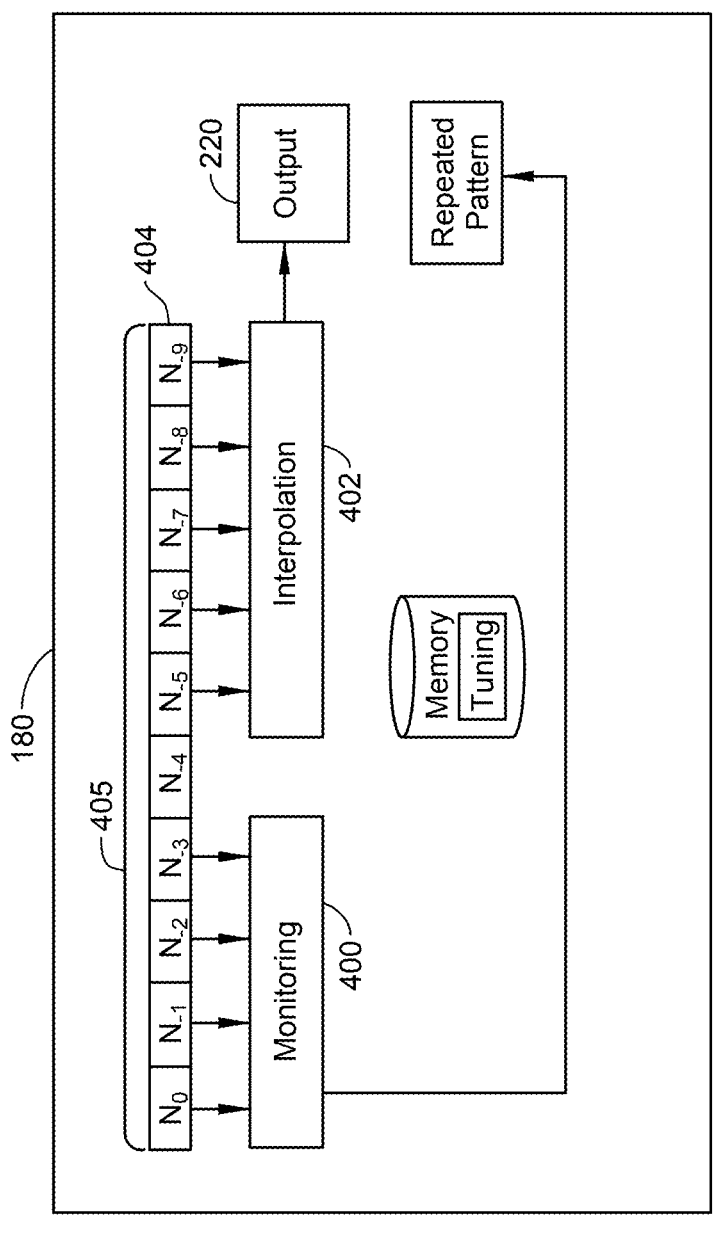
FIG. 4*a* depicts an interpolation bypass engine of FIG. 3, consistent with illustrative embodiments.

FIG. 4a more particularly depicts the IBE 180 can include a monitoring component 400 and an interpolation component 402. A programmable memory register 404 can store a sequence of data samples 405 obtained from the incoming signal 218, such as storing a sequence of ten data samples $N_0$ to $N_{-9}$ in this example. The sample No represents the leading (most recent) sample in the sequence. The sample $N_{-9}$ represents a sample obtained earlier in time, such as nine clock cycles previously. The contemplated embodiments are not limited to sampling at consecutive clock cycles, any desired sampling frequency can be selected for populating the programmable memory register 404 with a sequence of data samples 405.

The monitoring component 400 can read the first four samples ($N_0$ to $N_{-3}$) such as by enabling four corresponding communication taps (depicted by downward arrows). The interpolation component 402 can read the last five samples ($N_{-5}$ to $N_{-9}$) such as by enabling five corresponding taps. That leaves one sample ($N_{-4}$) untapped in this example. One or more such untapped samples allow for a desired delay between monitoring the signal and interpolating it. This construction is illustrative, not limiting of the contemplated embodiments. In other embodiments more or fewer taps can be provided to the monitoring component 400, and/or to the interpolation component 402, and/or in the untapped region therebetween.

The monitoring component 400 can include circuitry configured to monitor a predetermined number of the samples of the sequence for a predetermined pattern of signal values. In this example the monitoring component 400 monitors the four leading (most recently-obtained) samples $N_0$ to $N_{-3}$ for a selected pattern. Thus, in this example the predetermined pattern can be a single sample value, the values of two consecutive samples, the values of three consecutive samples, the values of four consecutive samples, or any other combinations of the four leading samples.

Figure 4B:
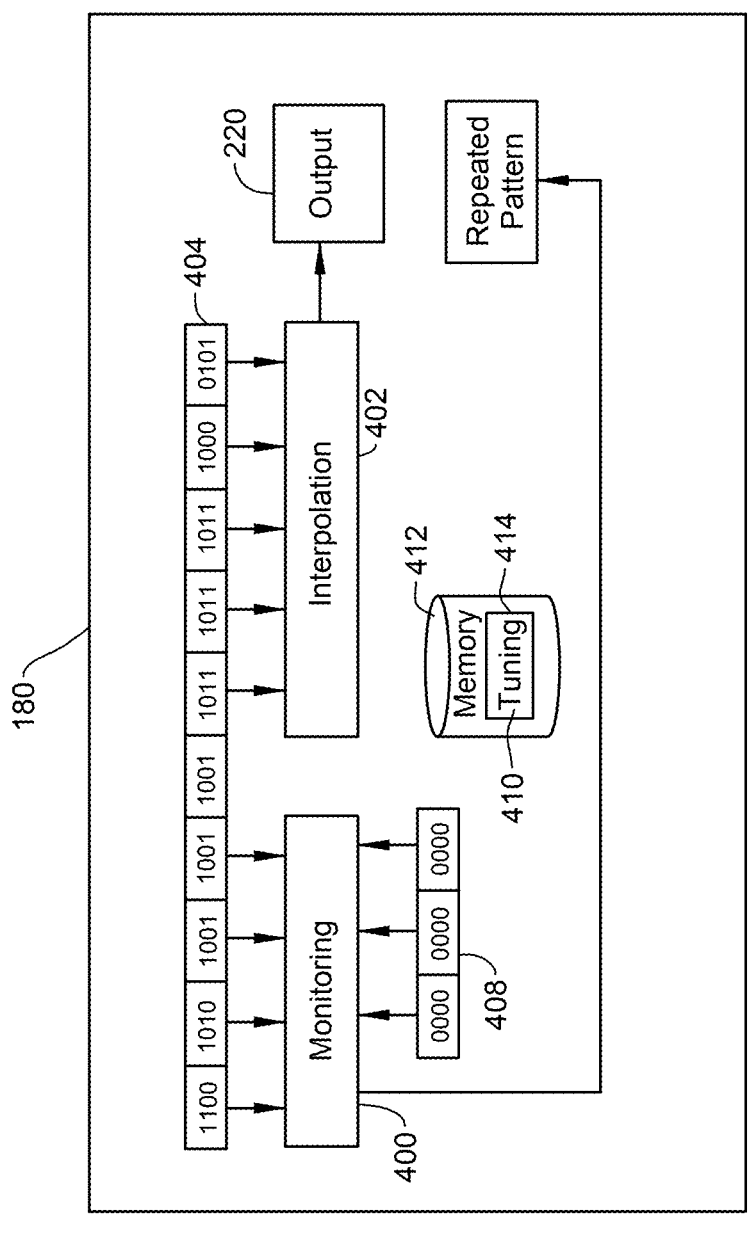
FIG. 4*b* depicts the interpolation bypass engine of FIG. 3 monitoring an illustrative sequence of signal samples and interpolating data samples in the waveform mode of operations, consistent with illustrative embodiments.

FIG. 4a depicts the IBE 180 in the waveform mode 306 when the interpolation component 402 can read the last five sequence samples ($N_{-5}$ to $N_{-9}$) of the signal 218 by enabling a like number of communication taps. In the waveform mode 306, the interpolation component 402 computes interpolation values for the samples of the sequence and includes those interpolation values to the output signal 220 (FIG. 2). FIG. 4b is similar to FIG. 4a, except that illustrative numerical sample values (signal values) are depicted for the sequence of samples 405 (FIG. 4a) stored in the programmable memory register 404.

Figure 5:
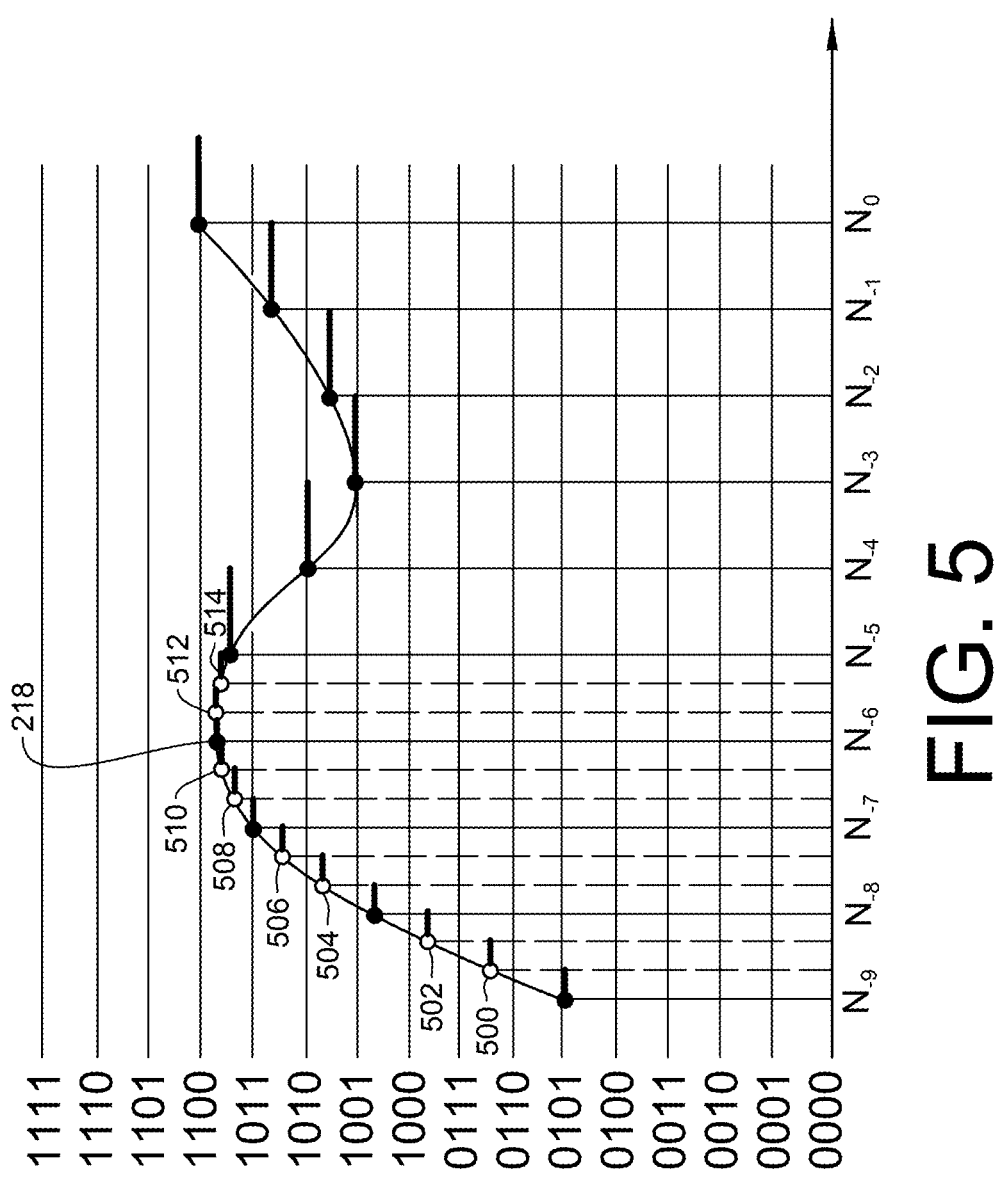
FIG. 5 graphically depicts the computational load on the interpolation component computing two interpolation values between adjacent data samples, consistent with illustrative embodiments.

FIG. 5 graphically depicts the signal 218 at the time it was sampled in FIG. 4b. FIG. 5 also depicts the algebraic computations performed by the interpolation component 402 during the waveform mode to compute interpolation values between adjacent data samples and add the interpolation values to the signal 218. For this example, as also depicted in FIG. 4b, the interpolation component 402 has computed eight interpolation values 500-514 at times intermediate to the sampling frequency from sample $N_{-9}$ to sample $N_{-5}$. These algebraic computations can be performed in many different ways, such as by determining maximum and minimum values of adjacent samples and performing straight line interpolations between the adjacent samples. As depicted in the graph, adding interpolation values to the data samples is a way of upsampling the signal 218 for improved signal resolution. Computing and adding two interpolation values in this example is merely illustrative and not limiting. Fewer or more interpolation values can be computed and added in alternative embodiments.

Returning to FIG. 4b, during the waveform mode, the monitoring component 400 continuously monitors the leading four samples ($N_0$ to $N_{-3}$) for the predetermined pattern of signal values. For example, a monitoring for the purpose of determining when the signal 218 is de-asserted (or latent) could monitor the leading samples for amplitude values that drop to zero, or a 0000 signal value. Furthering the present example for the purpose of monitoring when the signal 218 is de-asserted, a predetermined pattern 408 of three consecutive data samples having the value 0000 can be supplied to the monitoring component 400 for monitoring the sample sequence. This example is illustrative not limiting, any predetermined pattern of signal values can be used for different monitoring purposes.

Figure 6:
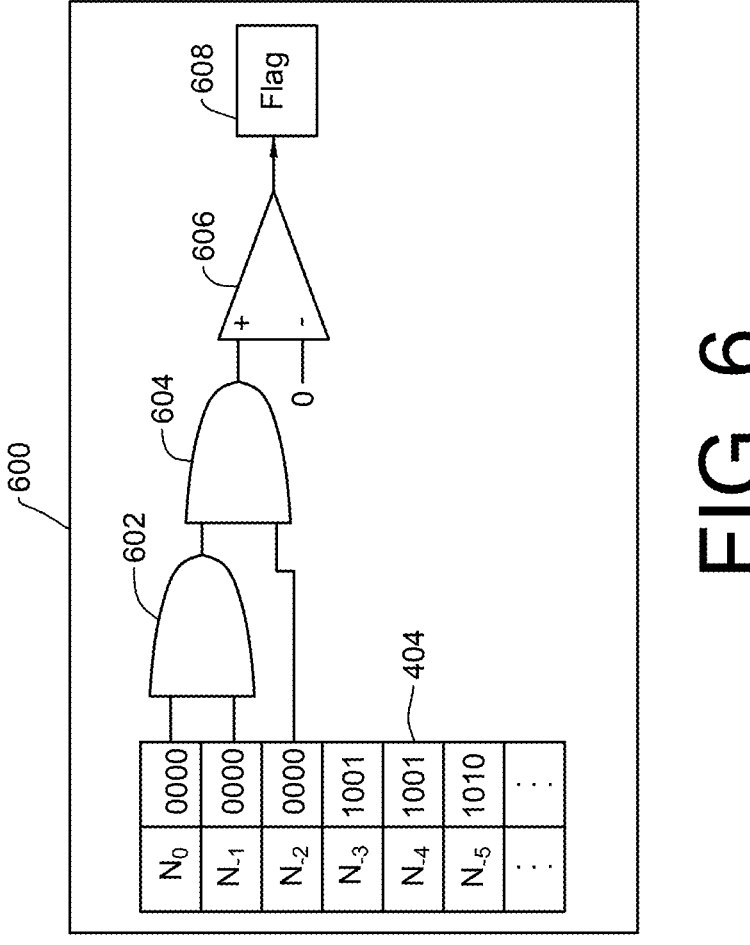
FIG. 6 depicts an example comparator circuit in the monitoring component in FIGS. 4*a*-4*f*, consistent with illustrative embodiments.

FIG. 6 schematically depicts an illustrative comparator circuit 600 that can be included in the monitoring component 400 to determine whether a sampled sequence includes the predetermined pattern of three consecutive signal values of 0000. Two AND logic gates 602, 604 are combined and fed to an inverting comparator 606 that pins a 1 value to a flag register 608. In this example the presence of sample values of 0000 for the three leading samples can assert the flag 608 which can, in turn, result in the monitoring component 400 switching the interpolation component 402 to the bypass mode. Conversely, if while monitoring a repeating pattern of 0000 values the comparator circuit 600 reads a nonzero sample, then the flag 608 can be de-asserted which can, in turn, result in switching the interpolation component 402 from the bypass mode 308 to the waveform mode 306.

Figure 4C:
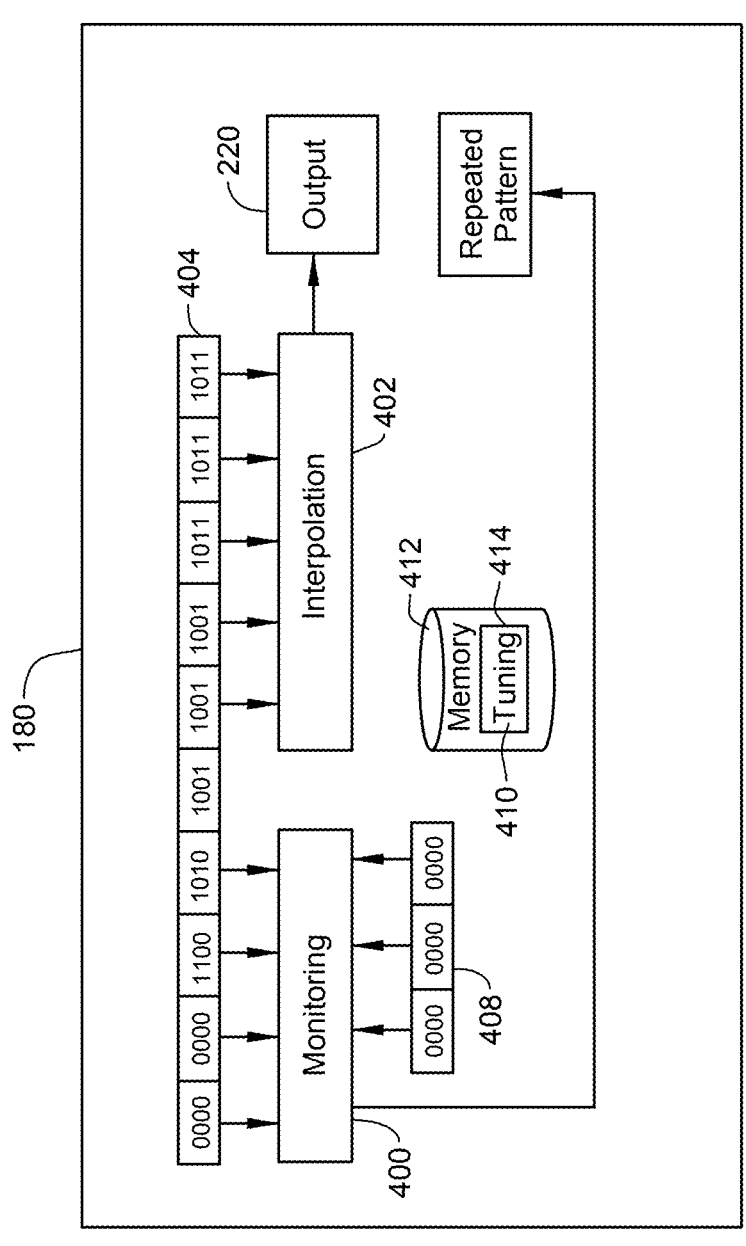
FIG. 4*c* depicts the interpolation bypass engine of FIG. 4*b* after two subsequent samplings and still operating in the waveform mode, consistent with illustrative embodiments.
Figure 4D:
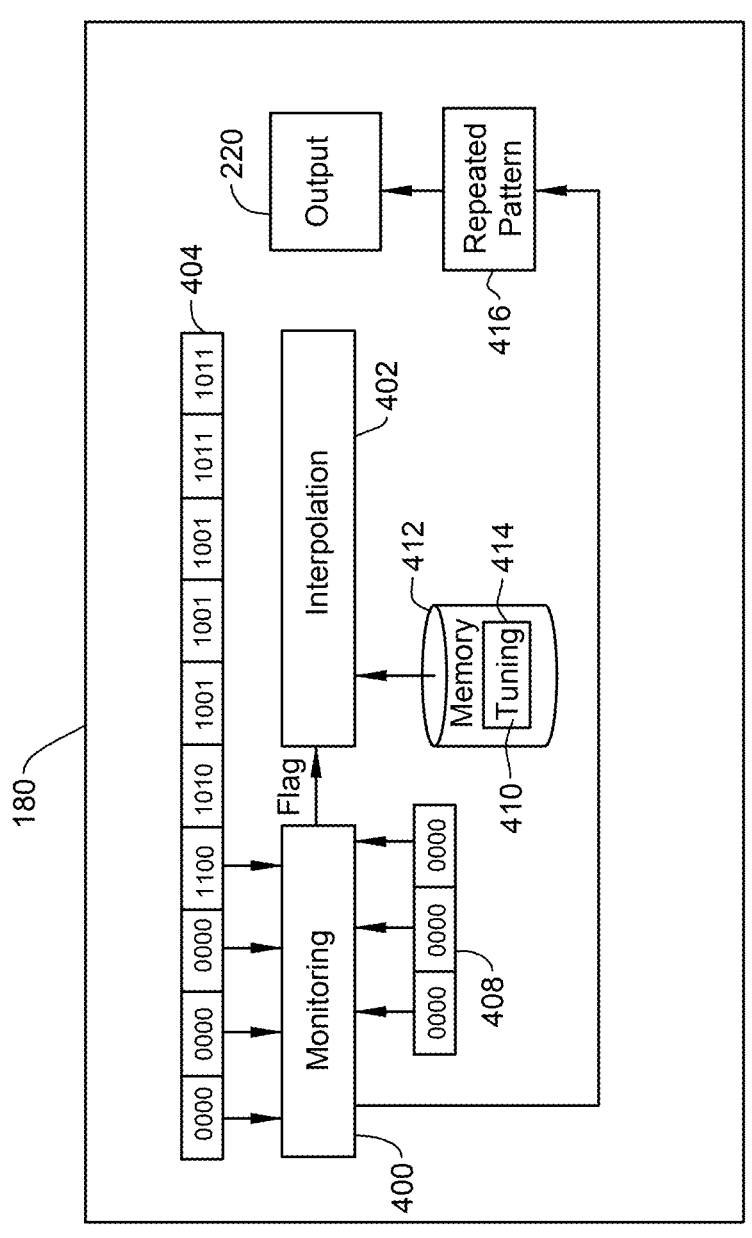
FIG. 4*d* depicts the interpolation component bypass of FIG. 4*c* after one subsequent sampling and switched to the bypass mode interpolating tuning samples, consistent with illustrative embodiments.

FIG. 4c is substantially similar to FIG. 4b but depicting a subsequent sequence of samples in which each of the two leading samples has a 0000 value. Since the predetermined pattern 408 is not included in this sequence, the IBE 180 remains in the waveform mode with the interpolation component 402 computing interpolation values for data samples and adding the interpolation values to the signal 218 at the output 220. FIG. 4*d* depicts the next sampled sequence which includes a leading sample value of 0000, and thus including the predetermined pattern 408 in this sequence. Upon determining the sequence of data samples includes the predetermined pattern of signal values, the monitoring component 400 can be configured to send an interpolation bypass signal to switch the interpolation component 402 to the bypass mode 302. FIG. 4*d* depicts, in this example, the monitoring component 400 can send the interpolation bypass signal by flagging the interpolation component 402, which is illustrative and not limiting. The monitoring component 400 can be configured to send the interpolation bypass signal in any desired way.

If the 0000 pattern continues, it would eventually fill up the programmable memory register 404 used by the interpolation component 402 to compute interpolation values. That would drive the computational load on the interpolation component 402 to zero because the maximum and minimum values of adjacent samples are constantly zero. Since no processing would be required on the incoming pattern of 0000 values, the interpolation component 402 would effectively become idle. This would reduce the interpolation component's power consumption and heat generation. Subsequently, coming out of a reduced-power or idle electrical state can cause power disturbances, such as by transient voltage drooping that degrades signal amplitude stability. Also, the computational load placed on the interpolation component 402 causes it to generate heat that creates signal noise from gain disturbances. Both of these disturbances, even in the range of microvolts, can degrade signal fidelity in low latency, high sensitivity systems like the quantum computing system of these illustrative embodiments. But the contemplated embodiments are not limited to quantum computing applications, as there are other low latency, high sensitivity circuitry and systems that can benefit from this technology as well.

Instead of presenting the oncoming pattern of 0000 values to the interpolation component 402, the bypass mode 308 switches the interpolation component 402 to computing interpolation values for noise values configured to stabilize the latent output of the interpolation component 402. In this example the noise is provided as predetermined tuning samples 410. The tuning samples 410 can be statically stored, or they can be dynamically stored in (e.g., programmable) memory 412. The memory 412 can include any desired type of memory, including integrated circuitry memory. The interpolation component 402 can be configured to read the tuning samples such as by enabling a communications bus or any other desired signaling or communications link.

Switching to the bypass mode 308 effectively causes the interpolation component 402 to compute interpolation values at all times, whether needed or not. Ideally, to achieve constant electrical current and temperature, the tuning samples 410 can be configured (or "tuned") to place the same or similar computational load on the interpolation component 402 in the bypass mode 308 as in the waveform mode 306. Power consumption (and current consumption) can be optimized such as by matching the tuning samples 410 to the interpolation component's power envelope. The computational load can be optimized such as by matching the tuning samples 410 to sampling frequency and the number of interpolation values that are computed during the waveform mode 306.

In one example, the tuning samples 410 could provide a generic sequence including a repeating pattern of 0 values and 1 values for computing midrange interpolation values. In another example, the tuning samples 410 can include a previously monitored sequence of samples for the signal 218. That is, for example, the samples depicted in the programmable memory register 404 in FIG. 4*b* can be mapped to another programmable memory register 414 to supply them to the interpolation component 402 as tuning samples 410 in the bypass mode 308. Such tuning samples can be expected to provide a similar computational load because they include a waveform that is similar to the expected signal 218 when it is asserted again. Similarity between the tuning samples 410 and the waveform of re-asserted signal 218 can cause substantially reduced (e.g., minimal) power and temperature fluctuations, resulting in improved performance, such as in terms of amplitude stability and noise reduction.

Referring to FIG. 4*d*, the interpolation component 402 computes interpolation values for the tuning samples 410 but withholds them from the output signal 220. This can be accomplished by disabling the communication link between the interpolation component 402 and an output stage in which the output signal 220 resides. The interpolation component 402 computes interpolation values for the tuning samples 410 for purposes of steady state current and temperature, not for upsampling the signal 218.

Along with flagging the interpolation component 402 to switch to the bypass mode 308, the sequence of samples that include the predetermined pattern 408 can be copied to another programmable memory register 416 for inclusion in the output signal 220. The output stage in which the output signal 220 resides can be configured to only enable a communications link with the interpolation component 402 during the waveform mode 306, and to only enable a communications link with the programmable memory register 416 during the bypass mode 308. Such a construction can limit disturbances that can arise from combining the two inputs, but is merely an example and not limiting.

Figure 4E:
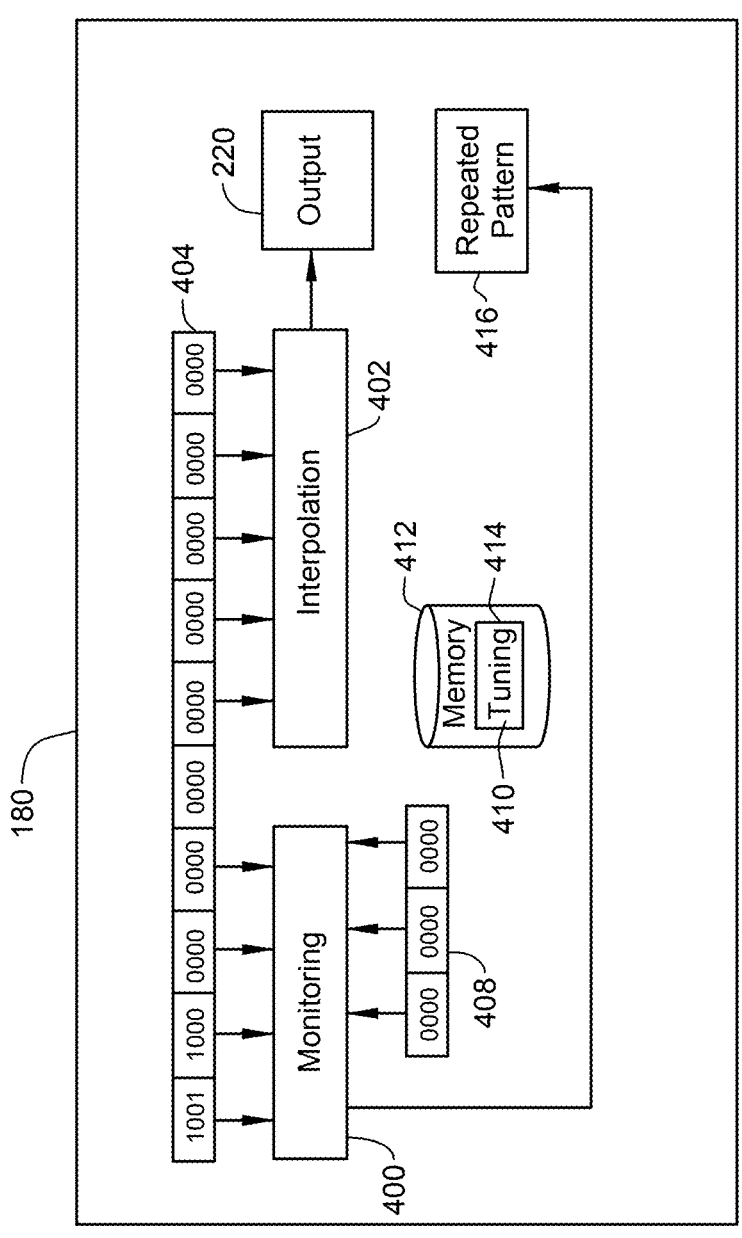
FIG. 4*e* depicts the interpolation bypass engine of FIG. 4*d* at a subsequent sampling when the interpolation component is switched to the waveform mode for interpolating data samples, consistent with illustrative embodiments.
Figure 4F:
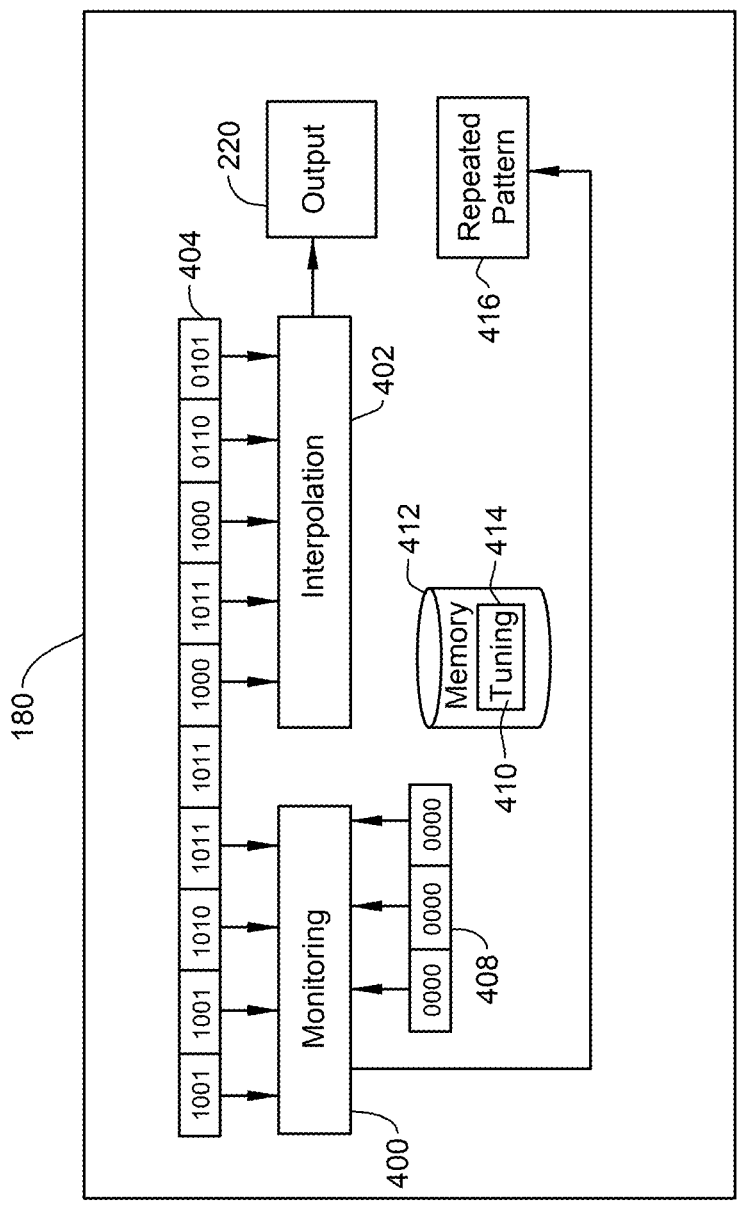
FIG. 4*f* depicts the interpolation bypass engine of FIG. 4*e* at a subsequent sampling when the sequence of signal values does not include the predetermined pattern of signal values, consistent with illustrative embodiments.

The monitoring component (e.g., circuit) 400 can continue to monitor sample sequences in the bypass mode 308. When the signal 218 is eventually re-asserted, then nonzero samples will be sampled. FIG. 4*e* depicts a subsequent sample sequence that includes two leading nonzero samples, ending the previous repeating 0000 pattern. In one example, FIG. 4*e* depicts the monitoring component 400 can be configured to de-assert the flag upon determining that the four leading samples do not include the predetermined pattern 408, such as by the comparator circuit 600 (FIG. 6). In another example, FIG. 4*f* depicts the monitoring component 400 can be configured to delay de-asserting the flag until an entire sampled sequence does not include the predetermined pattern 408. In either example, de-asserting the flag switches the interpolation component 402 to the waveform mode 306 so that it returns to computing interpolation values for data samples and adding those interpolations values to the output signal 220.

Figure 7:
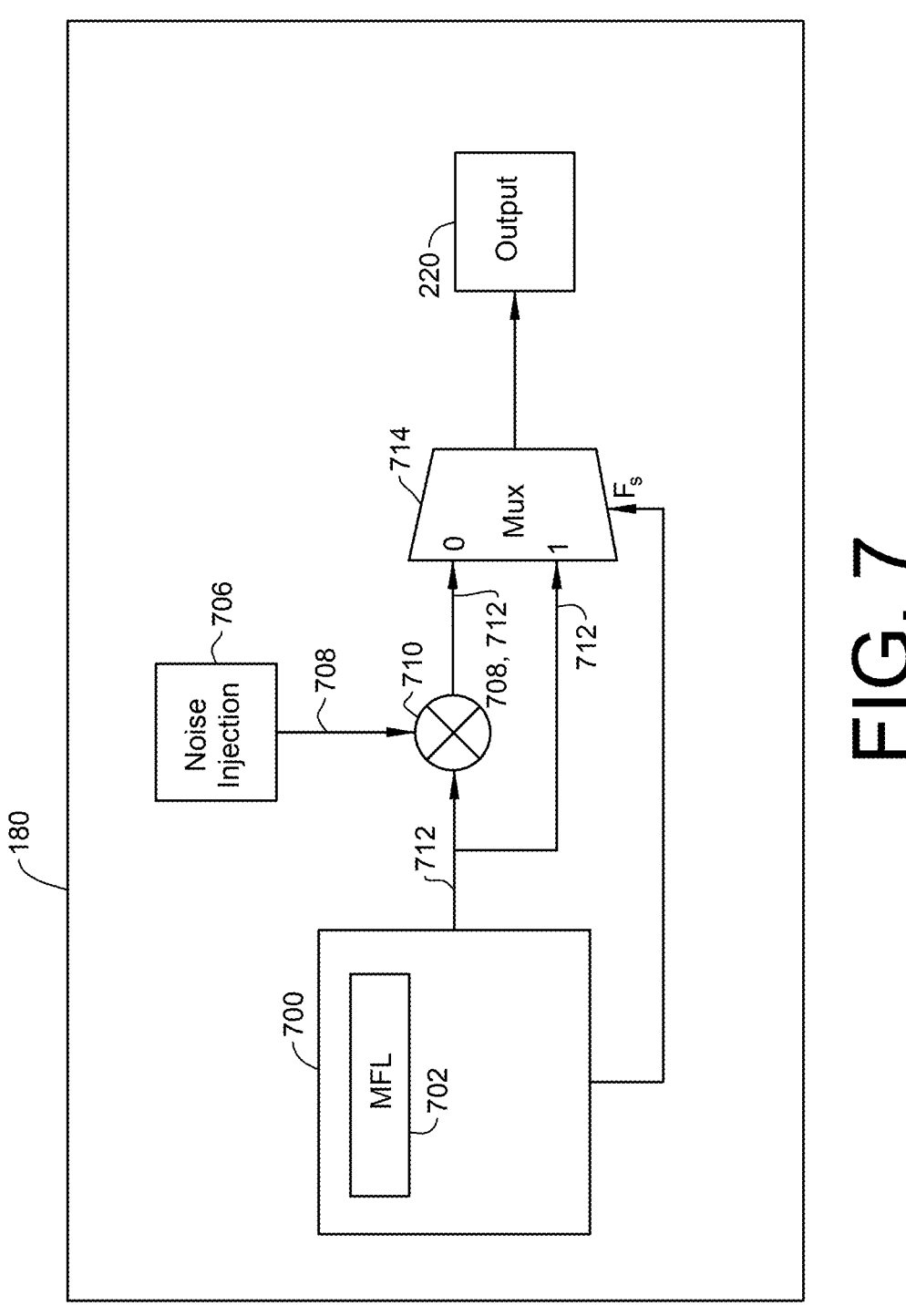
FIG. 7 depicts an interpolation bypass engine of FIG. 3, consistent with illustrative alternative embodiments.

FIG. 7 is a block depiction of alternative embodiments of the IBE 180 having a waveform processor component 700, such as a field programmable gate array ("FPGA"). The waveform processor component 700 can include an MFL block 702. In some embodiments, the MFL block 702 can be the monitoring component 400 in FIGS. 4*a*-4*f*. In these embodiments, the interpolation functionality can be performed by the DAC 222 upon receiving the output signal 220 from the IBE 180.

Generally, a noise injection component 706 can compute a programmed noise signal 708 that can be added by a mixer 710 to a data pattern signal 712 from the waveform processor 700. A programmable multiplexer 714 can selectively supply the data pattern signal 712 to the output signal 220, and in turn to the DAC 222 (FIG. 1), either with or without the injected noise signal 708. Such an arrangement is suitable for gating the noise signal 708 in the data pattern signal 712 to the DAC 222.

Figure 8:
FIG. 8 depicts a waveform spectrum snapshot of power and frequency domain.

FIG. 8 depicts a spectrum analysis snapshot of power (vertical axis) versus frequency domain (horizontal axis). It shows four noise floor levels 802, 804, 806, 808 associated with different sources of noise while gating pseudorandom broadband noise to stabilize output from the DAC 222 during latent operation. For example, the lowest noise floor 802 can come from just the instrumentation being used for the signal processing. A slightly higher noise floor 804 can come from connecting system electronics to the instrumentation. The gated data pattern signal 712 can raise the noise floor 806 even higher. The highest noise floor 808 can come from the ungated data pattern signal 708, 712. A carrier signal 810 is generated in the data pattern signal 712, such as for transmitting information to or from a qubit 202 (FIG. 2). Ideally, the waveform processor 700 configures the un-gated noise signal 708, 712 to stabilize output of the DAC 222 output during latency periods, and with minimal degradation of the signal-to-noise ratio that is associated with raising the noise floor.

Figure 9:
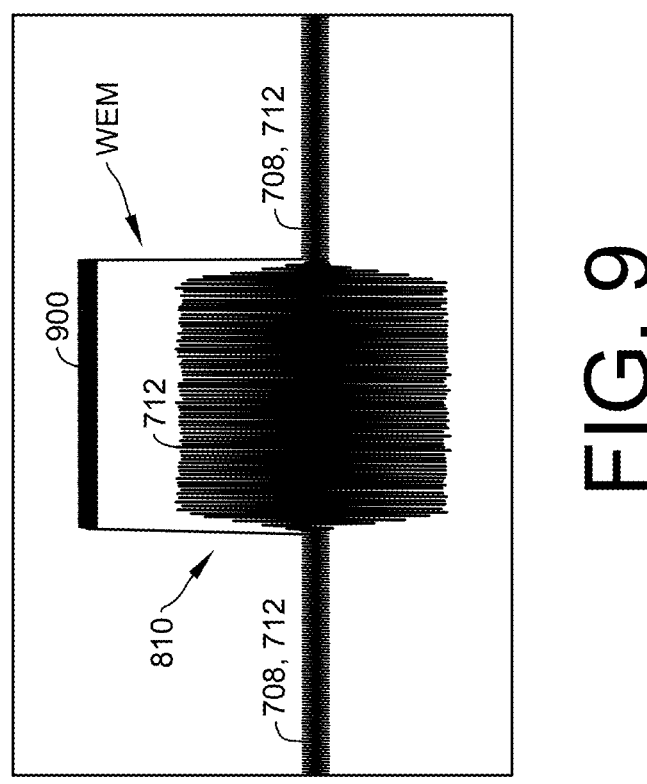
FIG. 9 depicts a waveform encapsulation marker for de-asserting injected noise for a signal pulse.

FIG. 9 more particularly shows the carrier signal 810 in the form of a high-frequency signal pulse, configured for conveying information such as to or from a qubit (FIG. 2). Before and after the signal pulse, the un-gated data pattern signal 708, 712 is transmitted by the IBE 180 for stabilizing output of the DAC 222 during latency periods. The waveform processor 700 can include a waveform encapsulation marker ("WEM") 900 in its data pattern signal 712 that de-asserts the injected noise signal 708 for the duration of the signal pulse. This gates the injected noise so that the DAC 222 processes only the data pattern signal 712 with no injected noise.

Figure 10:
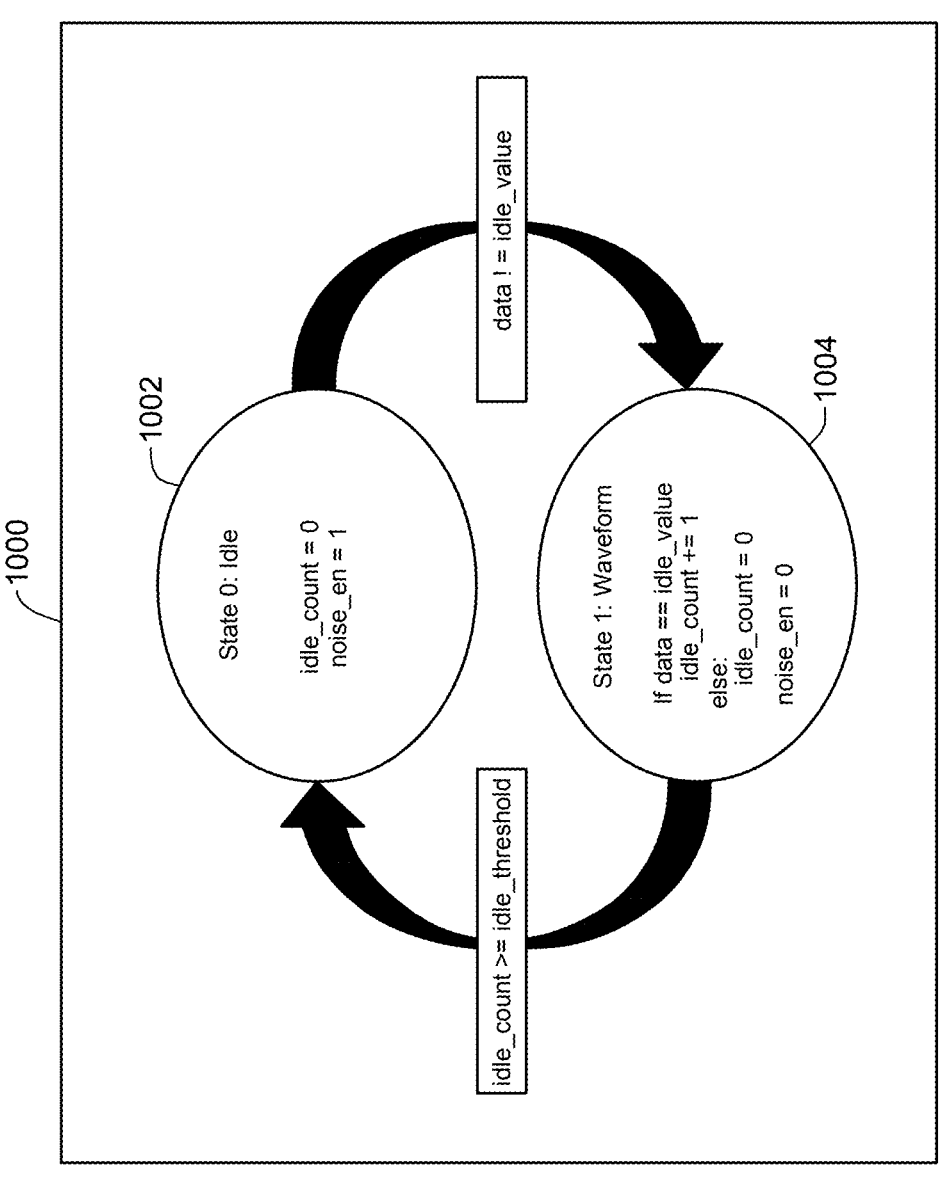
FIG. 10 depicts a state machine for executing the interpolation bypass engine of FIG. 3, consistent with illustrative embodiments.
Figure 11:
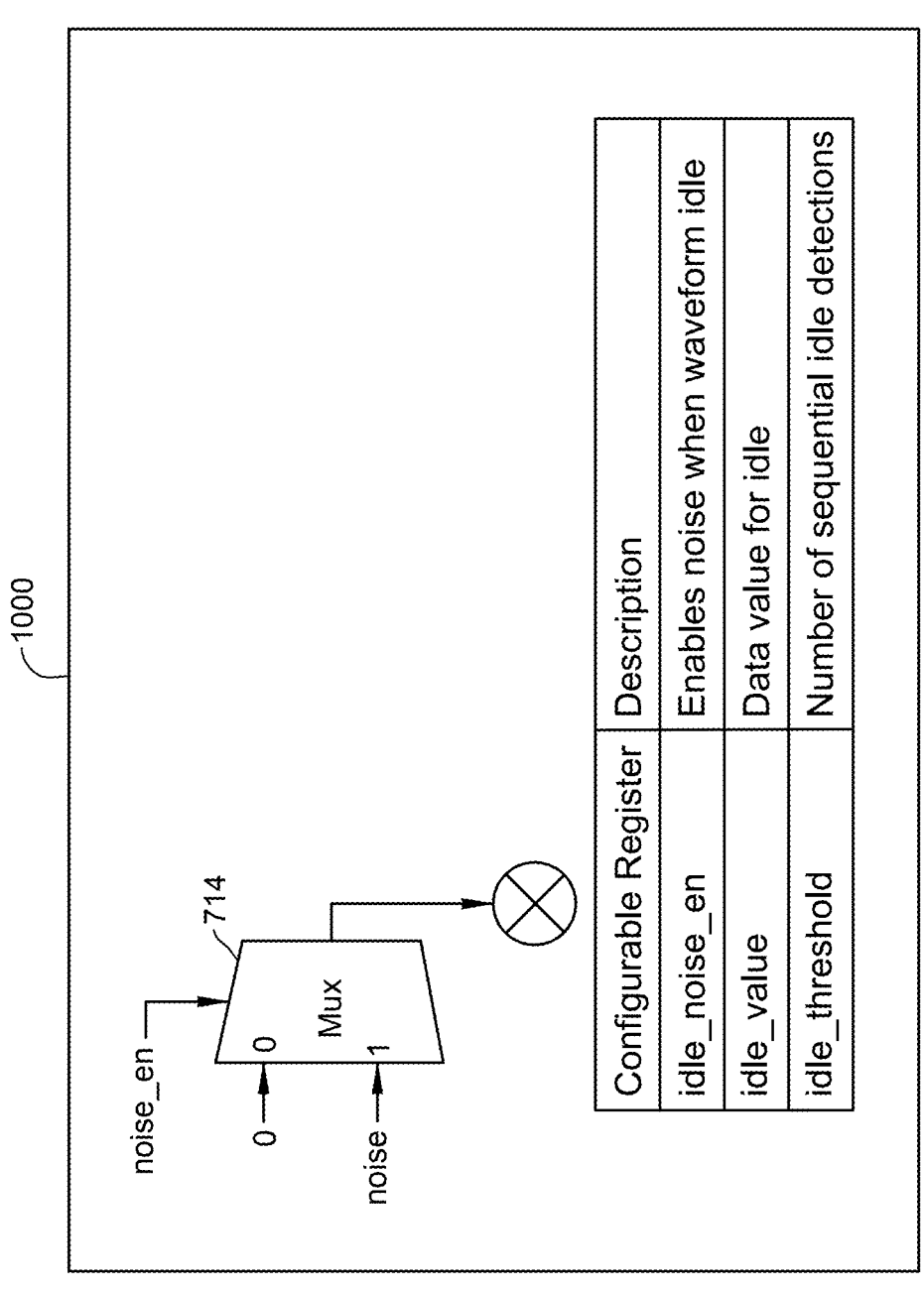
FIG. 11 depicts structural aspects of the state machine of FIG. 10, consistent with illustrative embodiments.

FIG. 10 depicts a state machine 1000 that can be responsive to the MFL block 702 in toggling between the bypass state 1002 and the waveform state 1004. The state machine 1000 can reside anywhere, such as within the IBE 180 in the waveform processor 700 or outside the IBE 180 such as in a digital front end of the DAC 222. In the bypass state 1002, it injects noise to the DAC 222 for stabilizing its output during latent operation. In the waveform state 1004, it gates the noise to the DAC 222 for signal processing of just the data pattern signal 712. FIG. 11 depicts the state machine 1000 can process information stored in configurable computer registers. These can provide for any desired programming functionality, including a latency indicator "idle_noise_en" value for signaling noise injection, an "idle_value" pointer to the noise being injected during latency periods, and an "idle_threshold" value of predetermined number of sequential idle signal values that causes the state machine 1000 to switch to the waveform state 1004.

Figure 12:
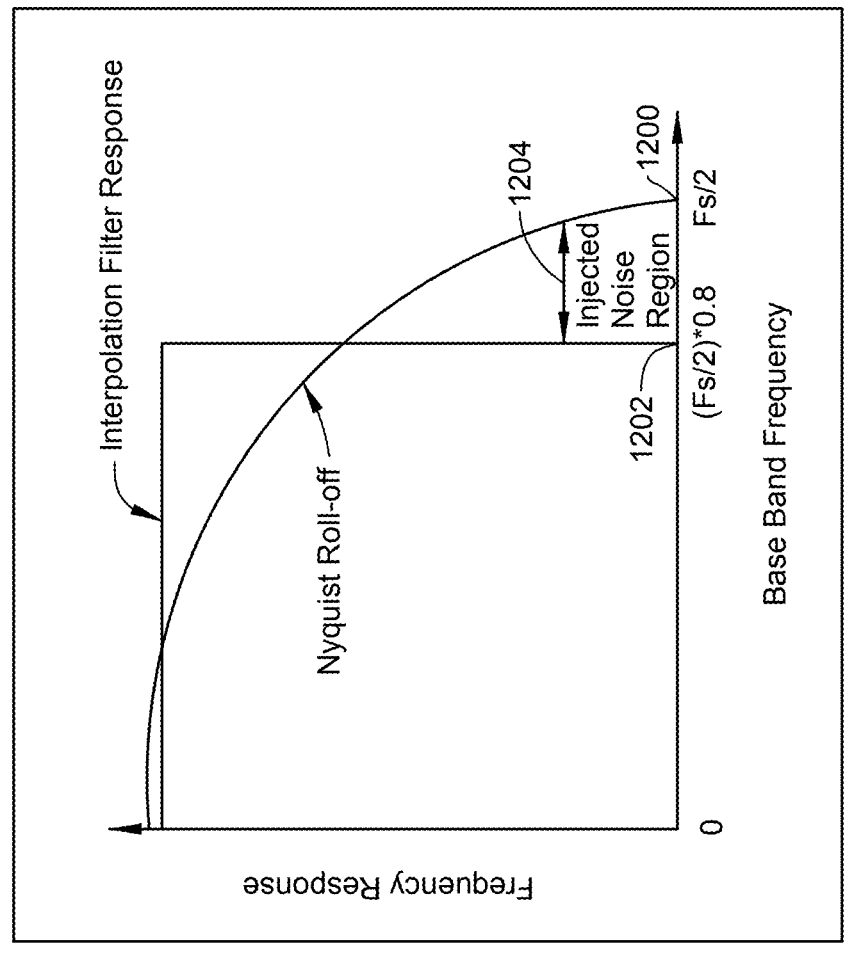
FIG. 12 graphically depicts injecting periodic noise correlated to a frequency pass band of an interpolation component.

FIG. 12 depicts alternative embodiments that can match characteristics of the injected noise to a predetermined frequency specification, instead of gating the noise. For example, the DAC 222 can employ digital signal processors that operate under certain frequency band restrictions. This means the DAC data sampling rate ("$F_s$") is limited to the Nyquist sampling limit ("Fs/2") 1200. But interpolation filters in the DAC 222 can impose additional frequency restrictions on the analog frequency response. So if, for example, the $F_s$ is two gigasamples/second ("GS/s"), then passband filtering in the DAC 222 can attenuate frequencies below the Nyquist limit 1200 and above an upper bound 1202 on its analog frequency response. FIG. 12 depicts an illustrative 20% bandwidth margin 1204 for selecting periodic noise frequencies that can be injected to stabilize latent output of the DAC 222, and that will be attenuated by the DAC 222 without adverse effect on its output.

Figure 13:
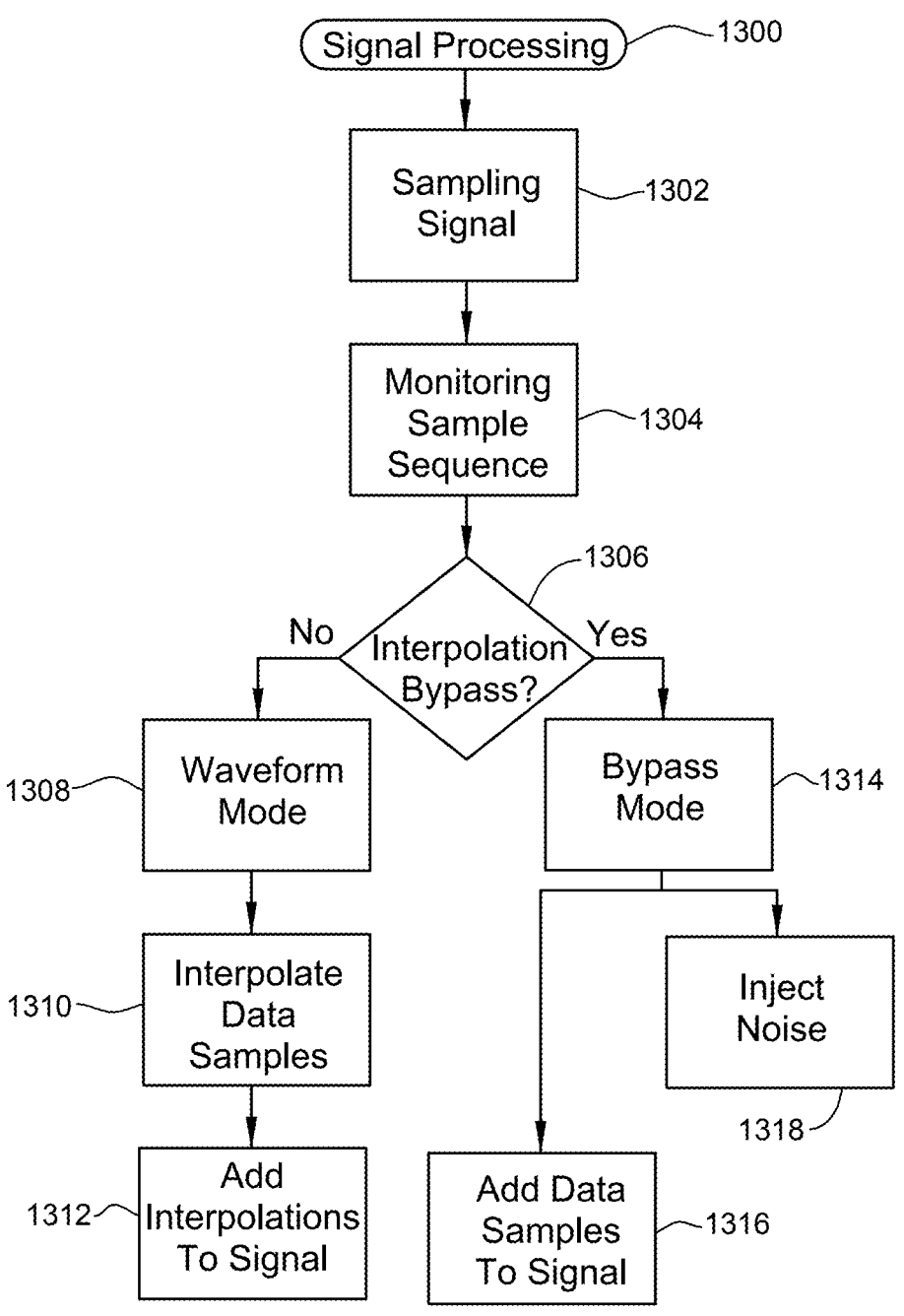
FIG. 13 is a flowchart depicting blocks in a method for signal processing, consistent with illustrative embodiments.

FIG. 13 is a flowchart depicting blocks in an illustrative computer-implemented method 1300 for processing a signal for a digital-to-analog converter ("DAC"), consistent with illustrative embodiments. The method 1300 begins at block 1302 with sampling a sequence of the signal. Block 1304 monitors a predetermined number of samples of the sequence for a predetermined pattern of signal values. The predetermined number of samples of the sequence can be less than or equal to a total number of samples in the sequence of samples. For example, without limitation, FIGS. 4a-4f depict monitoring the leading four samples in the sequence 404 of ten samples. In equivalent alternative embodiments not depicted, the predetermined number of monitored samples in FIGS. 4a-4f can be up to all ten of the samples in the sequence 404. Block 1306 determines whether the samples of the sequence include the predetermined pattern of signal values.

If block 1306 determines that the samples of the sequence do not include the predetermined pattern of signal values, then block 1308 passes control to a waveform mode. In the waveform mode, block 1310 employs the interpolation component to compute interpolation values for samples of the sequence. Block 1312 adds the computed interpolation values to the output signal at block 1312.

If block 1306 determines that the samples of the sequence include the predetermined pattern of signal values, then block 1314 passes control to the bypass mode. In the bypass mode, block 1316 adds the samples of the sequence including the predetermined pattern of signal values to the output signal. Block 1318 injects noise to stabilize an output of the interpolation component during latent operation, but the noise is withheld from an output of the DAC.

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Numerous other embodiments are also contemplated. These include embodiments that have fewer, additional, and/or different components, steps, features, objects, benefits, and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

It is to be appreciated that the computer system (e.g., the specialized computer 101, the interpolation bypass engine 180, and/or the processing resources) performs acts involving signal processing that cannot be performed by a human (e.g., is greater than the capability of a single human mind). For example, an amount of data processed, a speed of processing of data and/or data types of the data processed over a certain period of time can be greater, faster and different than an amount, speed and data type that can be processed by a single human mind over the same period of time. The computer system can also be fully operational towards performing one or more other functions while also performing the above-referenced signal processing functions. Moreover, signal processing output generated by computer system can include information that is impossible to obtain manually by a user. For example, an amount of information included in the signal processing output and/or a variety of information included in the signal processing output can be more complex than information obtained manually by a user.

Moreover, because at least the signal processing is established from a combination of electrical and mechanical components and circuitry, a human is unable to replicate or perform processing performed by the computer system (e.g., specialized computer 101, the interpolation bypass engine 180, resources) disclosed herein. For example, a human is unable to communicate data and/or process data associated with the interpolation bypass engine 180 for a given downstream task. Additionally, the specialized computer 101 significantly improves the operating efficiencies of the computer system by accurately and reliably eliminating detrimental signal amplitude instability and noise.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed:

1. A computer-implemented method for processing a digital signal for a digital-to-analog converter ("DAC"), comprising:

sampling a sequence of the digital signal;

determining whether the sampled sequence includes a predetermined pattern of signal values;

upon determining that the sampled sequence does include the predetermined pattern of signal values:

sending samples of the sampled sequence including the predetermined pattern of signal values to the DAC;

injecting noise into an interpolation component; and withholding the injected noise from an output of the DAC.

2. The computer-implemented method of claim 1, wherein the noise is generated by the interpolation component computing interpolation values and operative to tune samples not included in the samples of the sequence.

3. The computer-implemented method of claim 2, wherein the sequence of the digital signal is a first sequence of the digital signal, and the method further comprising:

sampling a second sequence of the digital signal;

monitoring a predetermined number of samples of the second sequence for the predetermined pattern of signal values; and upon determining that the second sequence does not include the predetermined pattern of signal values, then switching to using the interpolation component to compute interpolation values for samples of the second sequence.

4. The computer-implemented method of claim 3, further comprising:

storing the tuning samples to a computer memory; and retrieving the stored tuning samples from the computer memory for computing interpolation values for the tuning samples.

5. The computer-implemented method of claim 4, wherein the tuning samples comprise a waveform.

6. The computer-implemented method of claim 5, wherein the tuning samples are operative to provide a predetermined computational load on the interpolation component.

7. The computer-implemented method of claim 1, wherein the noise comprises gating pseudorandom broadband noise in a data pattern signal to the interpolation component.

8. The computer-implemented method of claim 7, wherein the gating pseudorandom broadband noise comprises a waveform encapsulation marker in the data pattern signal.

9. The computer-implemented method of claim 1, wherein the noise comprises periodic noise correlated to a predetermined frequency restriction of the interpolation component.

10. The computer-implemented method of claim 1, further comprising transmitting the signal to control a qubit in a quantum computer.

11. An apparatus for processing a digital signal for a digital-to-analog converter ("DAC"), comprising:

a monitoring component configured to:

monitor a sequence of samples of the digital signal for a predetermined pattern of signal values;

upon determining that the sequence of samples does include the predetermined pattern of signal values:

sending samples in the sequence of samples that include the predetermined pattern of signal values to the DAC;

injecting noise into an interpolation component; and withholding the injected noise from an output of the DAC.

12. The apparatus of claim 11, wherein the injected noise is configured to match a power envelope of the interpolation component.

13. The apparatus of claim 12, wherein the injected noise is configured to hold electrical power consumption of the interpolation component substantially constant during operational and latency periods.

14. The apparatus of claim 11, further comprising a computer memory configured to store the injected noise comprising a sampled sequence of the signal.

15. The apparatus of claim 11, wherein the interpolation component is configured to compute the interpolation values for a predetermined number of the samples in the sequence of samples.

16. The apparatus of claim 15, wherein the predetermined number of samples in the sequence is less than or equal to a total number of samples in the sequence of samples.

17. The apparatus of claim 11, wherein the noise comprises gating pseudorandom broadband noise in a data pattern signal to the interpolation component.

18. The apparatus of claim 17, wherein the gating pseudorandom broadband noise comprises a waveform encapsulation marker in the data pattern signal.

19. The apparatus of claim 11, wherein the noise comprises periodic noise correlated to a predetermined frequency restriction of the interpolation component.

20. A computer system for processing a digital signal for a digital-to-analog convertor ("DAC"), the computer system having a processor, a computer-readable memory, a computer-readable tangible storage device, and program instructions stored on the storage device for execution by a processor via the computer-readable memory, wherein the computer system is configured to perform a method, comprising:

sampling a sequence of the digital signal;

determining whether the sampled sequence includes a predetermined pattern of signal values;

upon determining that the sampled sequence does include the predetermined pattern of signal values:

sending samples of the sampled sequence that include the predetermined pattern of signal values to the DAC;

injecting noise into an interpolation component; and withholding the injected noise from an output of the DAC.

* * * * *